US012523289B2

(12) United States Patent
Salgado et al.

(10) Patent No.: US 12,523,289 B2
(45) Date of Patent: Jan. 13, 2026

(54) ELECTRIC DRIVE UNIT WITH A SECONDARY OIL RESERVOIR

(71) Applicant: Schaeffler Technologies AG & Co. KG, Herzogenaurach (DE)

(72) Inventors: Andres Salgado, Puebla (MX); John Brevick, Newaygo, MI (US); Diego Alberto Abreu, Mexico City (MX); Antonio Eduardo Mogro Zambrano, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/411,853

(22) Filed: Jan. 12, 2024

(65) Prior Publication Data

US 2025/0230867 A1    Jul. 17, 2025

(51) Int. Cl.
*F16H 57/04* (2010.01)
*B60K 7/00* (2006.01)
*B60K 17/16* (2006.01)

(52) U.S. Cl.
CPC ....... *F16H 57/0427* (2013.01); *B60K 7/0007* (2013.01); *B60K 17/16* (2013.01)

(58) Field of Classification Search
CPC ............................ F16H 57/0427; B60K 17/16
See application file for complete search history.

(56) References Cited

U.S. PATENT DOCUMENTS

| 5,476,582 A | * | 12/1995 | Camping | ................ | F16N 39/06 |
| | | | | | 210/336 |
| 11,440,348 B1 | * | 9/2022 | Bodary | .................. | B60K 17/36 |
| 2007/0191168 A1 | * | 8/2007 | Corless | .............. | F16H 57/0483 |
| | | | | | 74/606 R |
| 2011/0162482 A1 | | 7/2011 | Jacobs et al. | | |

(Continued)

FOREIGN PATENT DOCUMENTS

EP           0067639 A2    12/1982
JP         2014119084 A  *  6/2014

OTHER PUBLICATIONS

Espace translation of JP 2014 119084 A (Year: 2014).*

(Continued)

*Primary Examiner* — Jason D Shanske
*Assistant Examiner* — Scott Lawrence Strickler
(74) *Attorney, Agent, or Firm* — Price Heneveld LLP

(57) ABSTRACT

An electric drive unit includes a motor that rotates a rotor shaft, a transmission assembly coupled with the rotor shaft, a differential assembly with a ring gear that interfaces with a gear of the transmission assembly, such that rotation of the rotor shaft drives rotation of the ring gear, and a housing. The housing includes a body, a cover that with the body forms an enclosure about an interior region of the housing in which the transmission and differential assemblies are disposed, wherein the interior region includes a primary oil reservoir, and a gasket coupled with the cover. The cover and the gasket define a secondary oil reservoir. The gasket defines an opening and at least one passage. Rotation of the (Continued)

ring gear delivers oil into the secondary oil reservoir from the primary oil reservoir via the opening, and the passage conveys oil to a portion of the differential assembly.

15 Claims, 11 Drawing Sheets

(56) References Cited

U.S. PATENT DOCUMENTS

2012/0295751 A1\* 11/2012 Okada ................ F16H 57/0483
475/160

OTHER PUBLICATIONS

Huertas, Jose I., et al., "Configuration of Electric Vehicles for Specific Applications from a Holistic Perspective," World Electric Vehicle Journal, 2022, 24 pages, vol. 13, Issue 29, MDPI, Basel, Switzerland.

\* cited by examiner

ELECTRIC DRIVE UNIT WITH A SECONDARY OIL RESERVOIR

FIELD OF THE DISCLOSURE

The present disclosure generally relates to an electric drive unit with a secondary oil reservoir. More specifically, the present disclosure relates to an electric drive unit that includes a primary oil reservoir and a secondary oil reservoir that is configured to receive oil and convey oil from the secondary oil reservoir to specific components of the electric drive unit.

BACKGROUND OF THE DISCLOSURE

Electric drive units often include primary oil reservoirs. Further, components of electric drive units, such as differentials and transmissions, require lubrication from oil.

SUMMARY OF THE DISCLOSURE

According to a first aspect of the present disclosure, an electric drive unit includes a motor that drives rotation of a rotor shaft, a transmission assembly operably coupled with the rotor shaft, a differential assembly that includes a ring gear that interfaces with a gear of the transmission assembly, such that rotation of the rotor shaft drives rotation of the ring gear, and a housing. The housing includes a housing body, a housing cover that cooperates with the housing body to define an interior region of the housing in which the transmission assembly and differential assembly are disposed, wherein the interior region includes a primary oil reservoir, and a gasket coupled with the housing cover such that the housing cover and the gasket cooperate to define a secondary oil reservoir. The gasket defines an opening and at least one passage. Rotation of the ring gear is configured to deliver oil into the secondary oil reservoir from the primary oil reservoir via the opening defined by the gasket, and the at least one passage is configured to convey oil to a portion of the differential assembly.

Embodiments of the first aspect of the disclosure can include any one or a combination of the following features:
- the gasket includes at least one elongated tubular conduit that defines the at least one passage, the at least one elongated tubular conduit extending outward from a surface of the gasket that is opposite the secondary oil reservoir;
- gravity propels the oil to the portion of the differential assembly from the secondary oil reservoir via the at least one passage;
- the at least one passage is configured to convey oil to a bearing of the differential assembly;
- the bearing is a side bearing;
- the at least one passage comprises a first passage that is configured to convey oil to a first side bearing of the differential assembly and a second passage that is configured to convey oil to a second side bearing of the differential assembly opposite the first side bearing;
- the opening is axially aligned with the ring gear and is oriented to generally face teeth of the ring gear;
- the opening is axially offset from the ring gear and a portion of the ring gear is positioned radially outboard of a portion of the secondary oil reservoir with respect to the axis about which the ring gear rotates; and
- the housing cover includes a plurality of ribs that guide oil delivered onto the housing cover from the ring gear axially toward the opening.

According to a second aspect of the present disclosure, an electric drive unit includes a motor that drives rotation of a rotor shaft, a transmission assembly that includes a ring gear, a differential assembly that is operably coupled with the transmission assembly via the ring gear, and a housing that defines a primary oil reservoir in which the transmission assembly and the differential assembly are disposed, a secondary oil reservoir, an opening via which the primary oil reservoir and the secondary oil reservoir are in fluid communication, and at least one passage. Rotation of the ring gear is configured to deliver oil into the secondary oil reservoir from the primary oil reservoir via the opening, and the at least one passage is configured to convey oil from the secondary oil reservoir to a portion of the differential assembly.

Embodiments of the second aspect of the disclosure can include any one or a combination of the following features:
- the at least one passage is defined by at least one elongated tubular conduit;
- the at least one passage comprises a first passage that is defined by a first elongated tubular conduit and a second passage that is defined by a second elongated tubular conduit;
- the first passage conveys oil to a first side bearing of the differential assembly, and the second passage conveys oil to a second side bearing of the differential assembly;
- the at least one elongated tubular conduit angles vertically downward to an outlet, such that the oil is conveyed within the at least one passage by gravity;
- the opening is axially aligned with the ring gear and is oriented to generally face teeth of the ring gear; and
- the opening is axially offset from the ring gear and a portion of the ring gear is positioned radially outboard of a portion of the secondary oil reservoir with respect to the axis about which the ring gear rotates.

According to a third aspect of the present disclosure, an assembly includes a gearset, and a housing that defines a primary oil reservoir in which the gearset is disposed, a secondary oil reservoir, an opening via which the primary oil reservoir and the secondary oil reservoir are in fluid communication, and at least one passage defined by an elongated tubular conduit that is configured to convey oil from the secondary oil reservoir into the primary oil reservoir during operation of the gearset.

Embodiments of the third aspect of the disclosure can include any one or a combination of the following features:
- the gearset is a portion of a differential assembly;
- a bearing, wherein the elongated tubular conduit defines an outlet of the at least one passage that is proximate to the bearing, such that oil is conveyed to the bearing via the at least one passage; and
- the housing comprises a housing body that defines the primary oil reservoir, a housing cover, and a gasket that is disposed between the housing cover and the housing body, wherein the gasket and the housing cover cooperate to define the secondary oil reservoir.

These and other features, advantages, and objects of the present disclosure will be further understood and appreciated by those skilled in the art by reference to the following specification, claims, and appended drawings.

Figure 1:
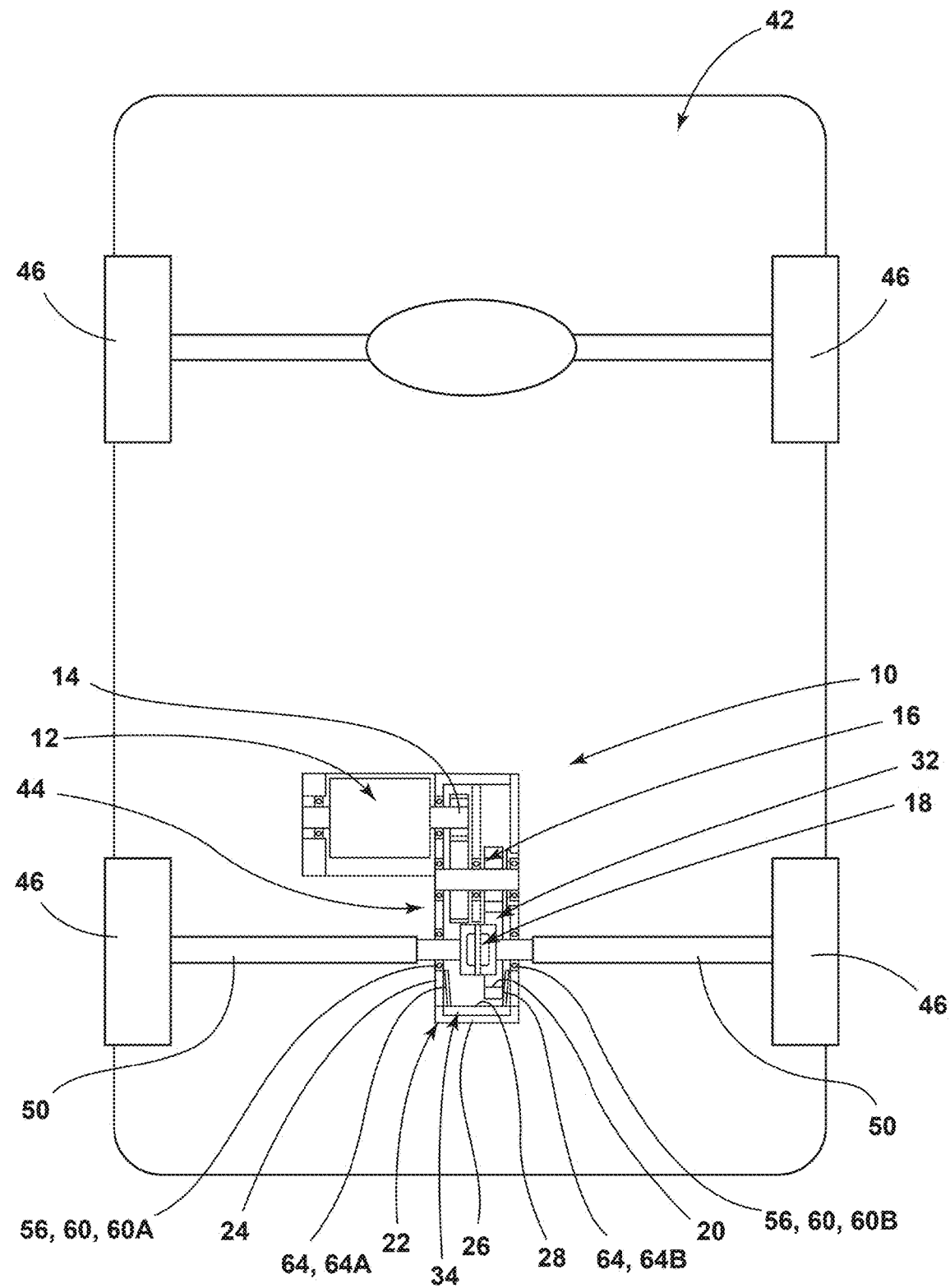
FIG. 1 is a schematic view of a vehicle that includes an electric drive unit with a primary oil reservoir and a secondary oil reservoir, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. The term "circumferential" and derivatives thereof, such as "circumferentially," shall be understood in relation to the axis of the aforementioned shaft.

Referring now to FIGS. 1-11, an electric drive unit 10 includes a motor 12 that drives rotation of a rotor shaft 14. A transmission assembly 16 is operably coupled with the rotor shaft 14. A differential assembly 18 includes a ring gear 20 and is operably coupled with the transmission assembly, such that rotation of the rotor shaft 14 drives rotation of the ring gear 20. The electric drive unit 10 includes a housing 22. The housing 22 includes a housing body 24, a housing cover 26, and a gasket 28. The housing 22 cover cooperates with the housing body 24 to form an enclosure about an interior region 30 of the housing 22 in which the transmission assembly 16 and the differential assembly 18 are disposed. The interior region 30 includes a primary oil reservoir 32. The gasket 28 is coupled with the housing cover 26 such that the housing cover 26 and the gasket 28 cooperate to define a secondary oil reservoir 34. The gasket 28 further defines an opening 36 and at least one passage 38. Rotation of the ring gear 20 is configured to deliver oil 40 into the secondary oil reservoir 34 from the primary oil reservoir 32 via the opening 36 defined by the gasket 28, and the at least one passage 38 is configured to convey oil 40 to a portion of the differential assembly 18.

Referring now to FIG. 1, a vehicle 42 is illustrated. The vehicle 42 may be an electric vehicle and/or a hybrid electric vehicle. In the embodiment illustrated in FIG. 1, the vehicle 42 includes the electric drive unit 10. As illustrated, the electric drive unit 10 is a portion of an electric axle assembly 44 of the vehicle 42. The electric drive unit 10 includes the electric motor 12, which includes a stator and a rotor (not shown) that is configured to drive rotation of the rotor shaft 14, in various embodiments. The rotor shaft 14 can be operably coupled with at least one wheel 46 of the vehicle 42, such that rotation of the rotor shaft 14 drives rotation of the at least one wheel 46 in operation of the electric drive unit 10. In various implementations, the electric drive unit 10 of the vehicle 42 includes one or more gearsets 48. For example, the electric drive unit 10 can include a transmission assembly 16 that includes a gearset 48 and/or a differential assembly 18 that includes a gearset 48, as described further herein. The gearset 48 of the transmission assembly 16 may be configured to interface with the rotor shaft 14 and/or the differential assembly 18, and the differential assembly 18 may be configured to interface with half shafts 50 of the vehicle 42 that are coupled with the wheels 46 of the vehicle 42. As such, rotation of the rotor shaft 14 by the electric motor 12 can drive rotation of the half shafts 50 and the attached wheels 46 of the vehicle 42 via the operable coupling of the half shafts 50 to the rotor shaft 14 by the transmission assembly 16 and the differential assembly 18.

Figure 2:
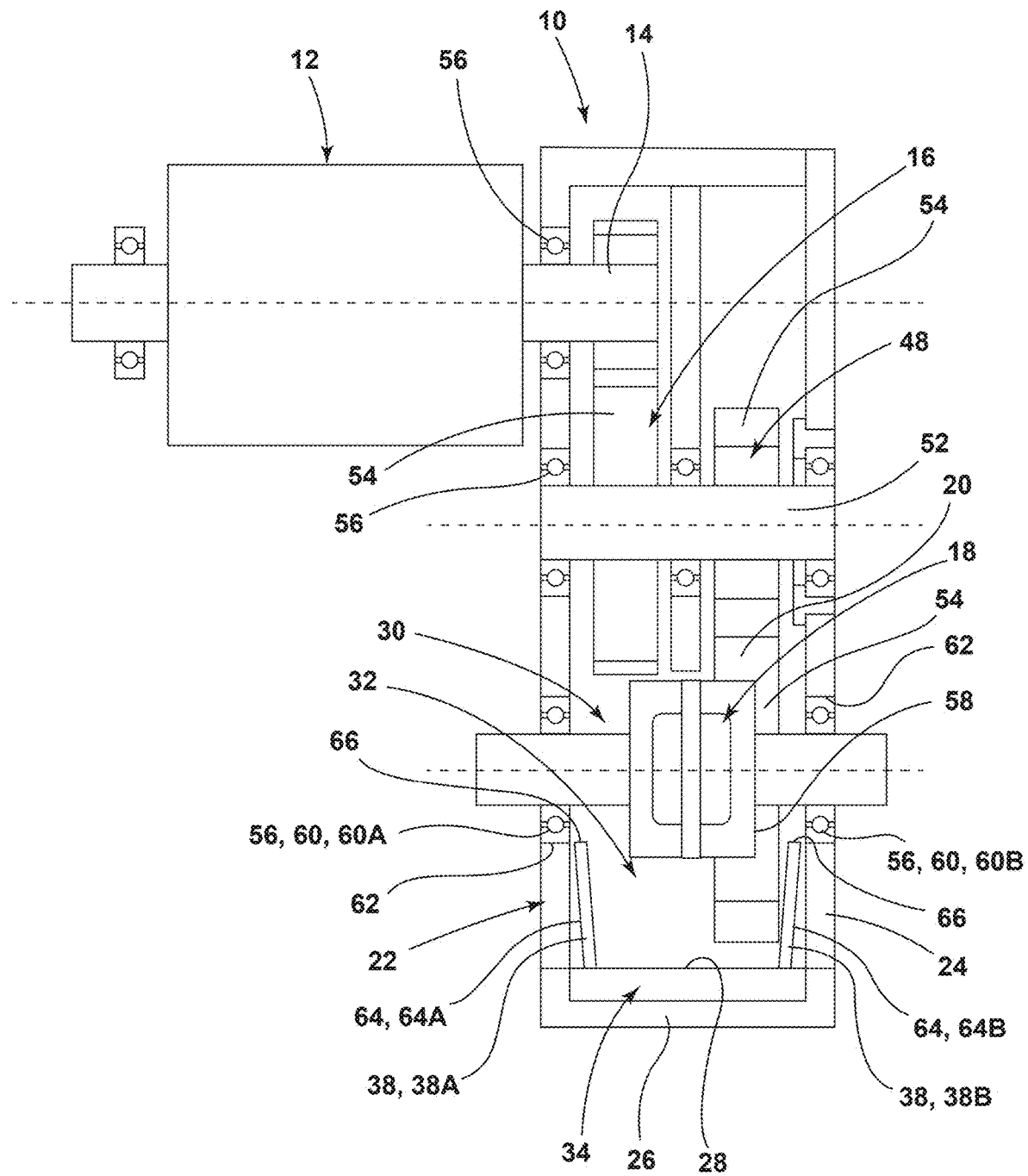
FIG. 2 is a schematic view of an electric drive unit that includes a primary oil reservoir and a secondary oil reservoir, according to one embodiment.

Referring now to FIG. 2, the transmission assembly 16 of the electric drive unit 10 can include an intermediate shaft 52. The intermediate shaft 52 may be configured to interface with the rotor shaft 14 via gears 54 and interface with the differential assembly 18 via gears 54, such that rotation of the rotor shaft 14 drives rotation of the intermediate shaft 52, which, in turn, drives rotation of at least a portion of the differential assembly 18, as described further herein. In the embodiment illustrated in FIG. 2, the differential assembly 18 includes the ring gear 20, and the ring gear 20 is engaged with a gear 54 of the transmission assembly 16, such that rotation of the rotor shaft 14 drives rotation of the ring gear 20 via the operable coupling of the rotor shaft 14 with the differential assembly 18 by the transmission assembly 16. The transmission assembly 16 further includes a plurality of bearings 56. The bearings 56 may be configured to support and/or facilitate rotation of the rotor shaft 14, the intermediate shaft 52, and/or a variety of other components of the transmission assembly 16. A variety of types of transmission assemblies 16 with a variety of types of gearsets (e.g., planetary, etc.) are contemplated for use in the electric drive unit 10.

Referring still to FIG. 2, the differential assembly 18 of the electric drive unit 10 includes the ring gear 20 that interfaces with a gear 54 of the transmission assembly 16. The ring gear 20 is operably coupled with a differential housing 58 that rotates with the ring gear 20. The differential housing 58 houses side gears that are operably coupled with the half shafts 50 of the vehicle 42, and spider gears that interface with the side gears and are configured to rotate about a connecting cross pin that rotates with the differential housing 58. Further, the differential assembly 18 includes a plurality of bearings 56. In the embodiment illustrated in FIG. 2, side bearings 60 that facilitate the rotation of components that rotate with the side gears are illustrated. A variety of types of bearings 56 may be used with the differential assembly 18 (e.g., pinion bearings, etc.). In various embodiments, a variety of seals 62 may be utilized in the differential assembly 18, such as side seals that are proximate to the side bearings 60 and are configured to seal the interior region 30 of the housing 22 of the electric drive unit 10, as described further herein.

Referring now to FIGS. 1-11, the electric drive unit 10 includes the housing 22. In various embodiments, the housing 22 is configured to define the interior region 30 of the housing 22. A variety of components of the electric drive unit 10 are disposed within the interior region 30 of the housing 22. For example, the motor 12, transmission assembly 16, and/or the differential assembly 18 may be disposed within the interior region 30 of the housing 22, as illustrated in FIG. 2. In the embodiment illustrated in FIG. 7, the electric drive unit 10 is a portion of the electric axle assembly 44. The housing 22 of the electric drive unit 10 doubles as the housing 22 for the electric axle assembly 44, as a portion of the housing 22 is a banjo-style axle housing. A variety of types of housings 22 are contemplated.

Figure 6:
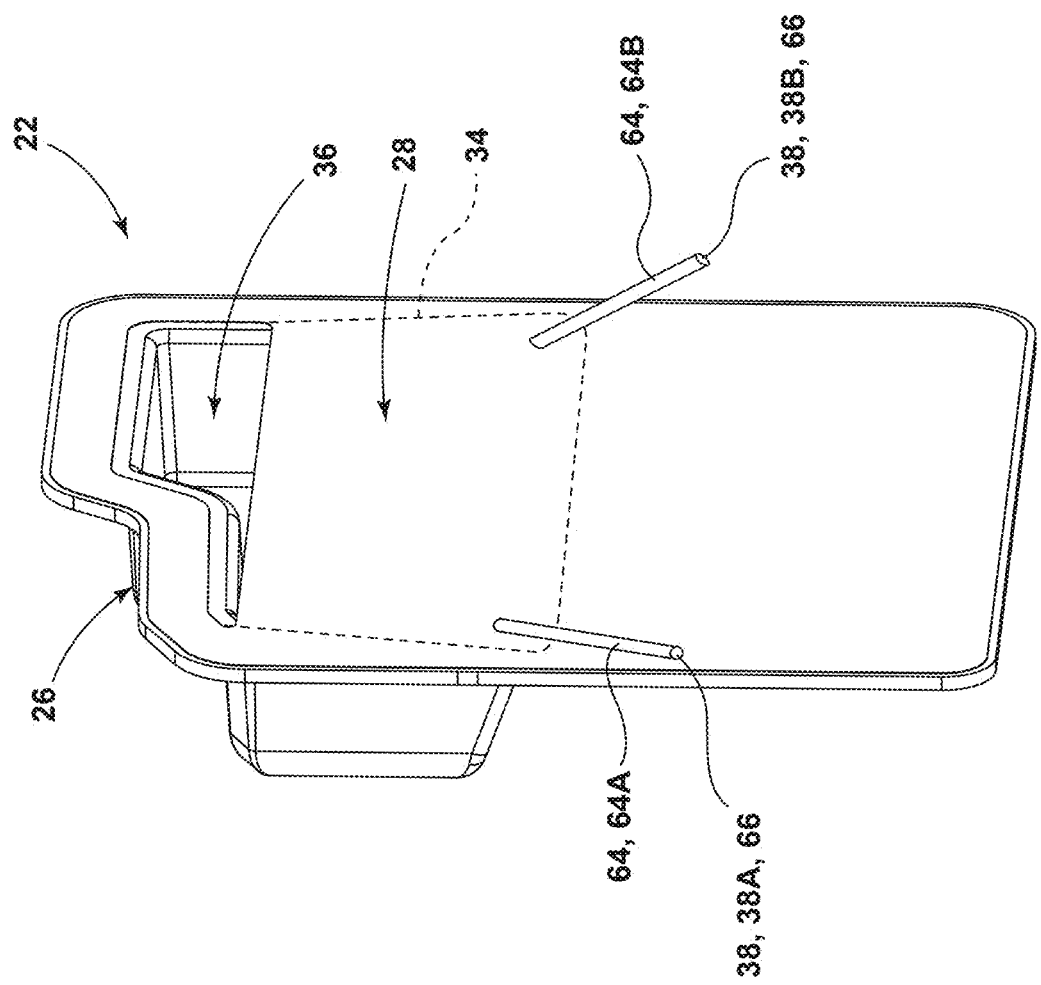
FIG. 6 is a perspective view of a housing cover and a gasket coupled to the housing cover having first and second elongated tubular conduits extending outward therefrom, according to one embodiment.
Figure 7:
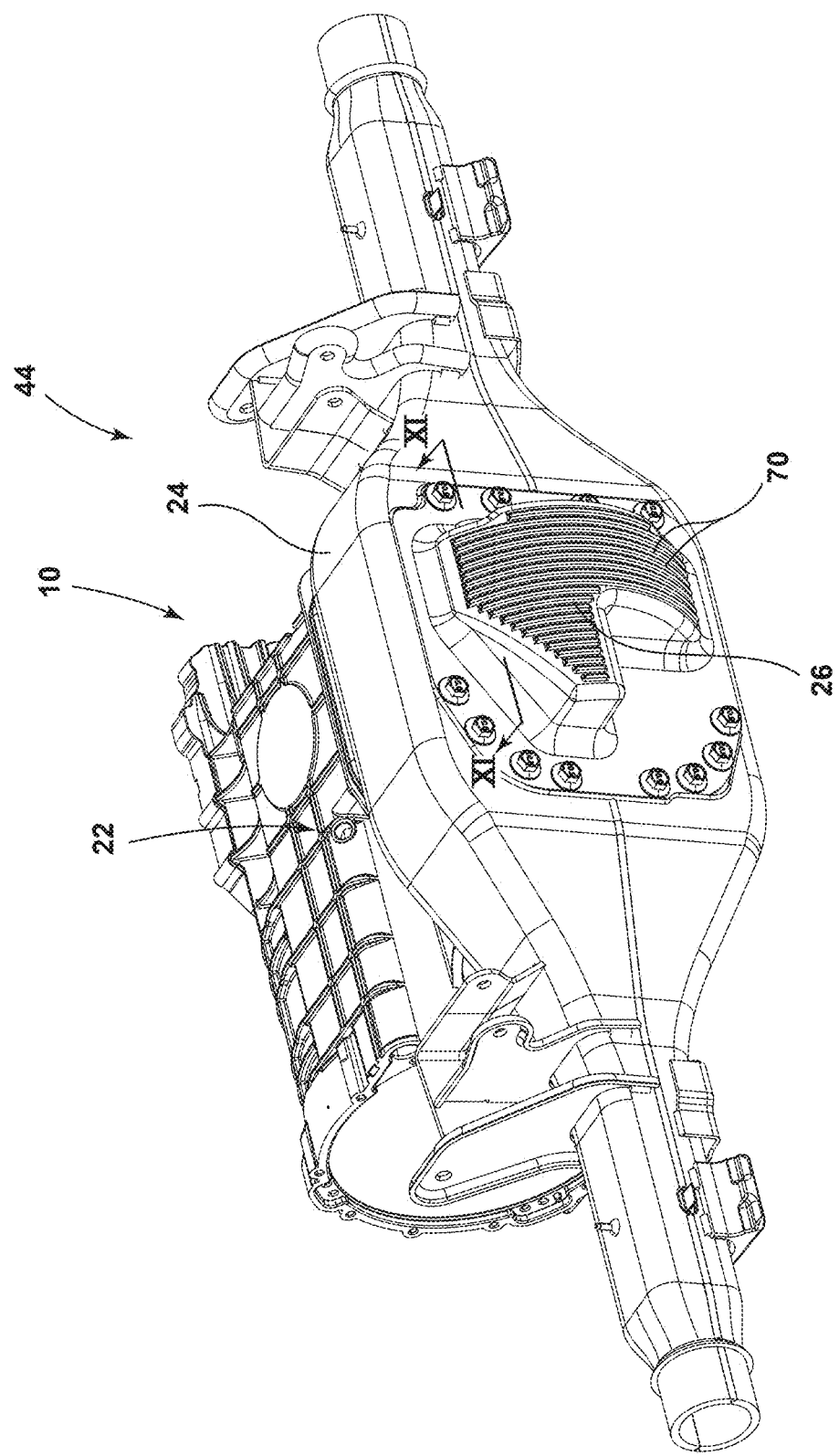
FIG. 7 is a perspective view of an electric axle assembly, illustrating a housing cover coupled to a housing body of a housing of the electric axle assembly, according to one embodiment.
Figure 8:
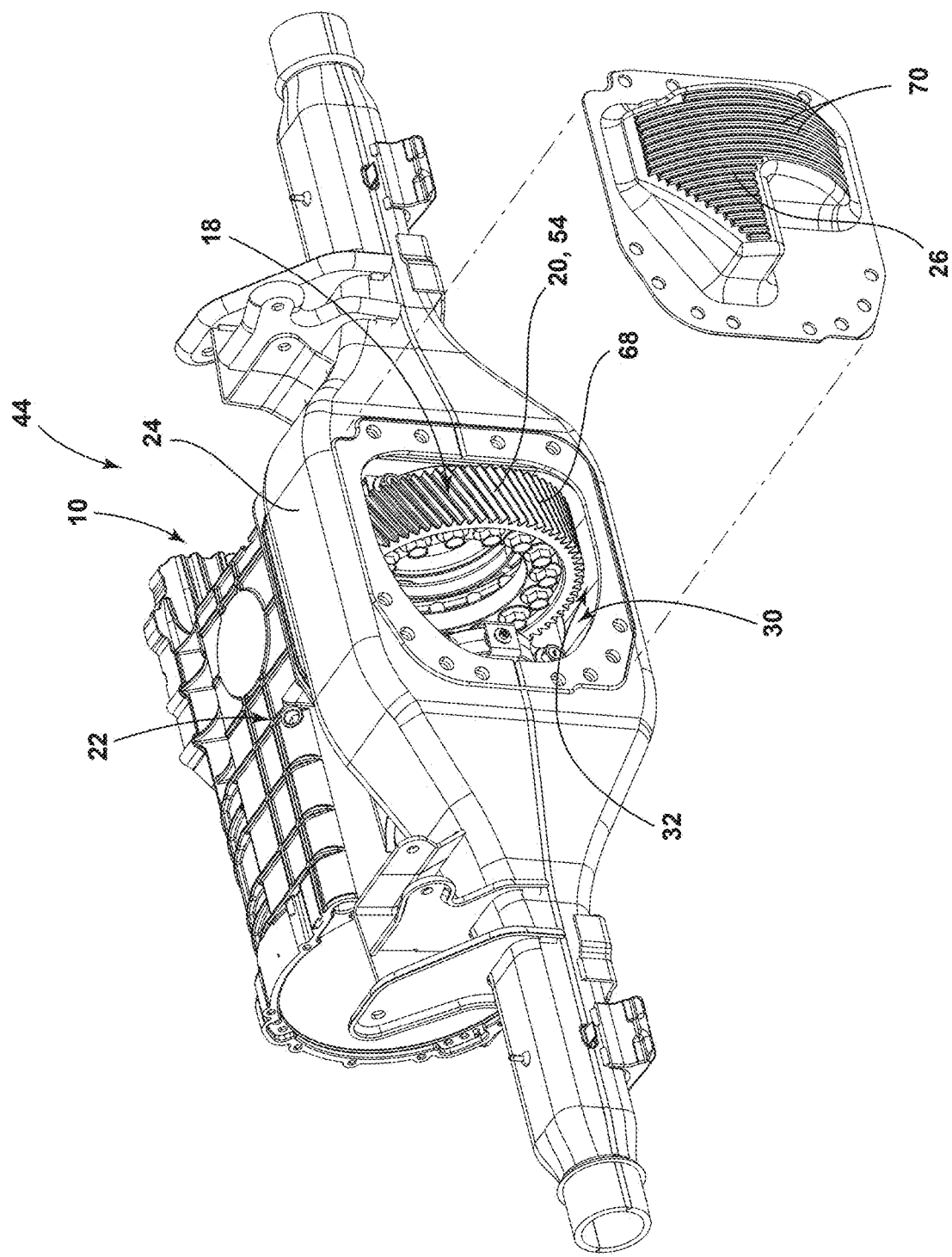
FIG. 8 is a perspective view of an electric axle assembly, illustrating a housing cover in a removed condition relative to a housing body of the electric axle assembly, according to one embodiment.

Referring still to FIGS. 1-11, in various embodiments, the housing 22 includes the housing body 24, the housing cover 26, and the gasket 28. The housing body 24 may be an assembly of a plurality of components, in some embodiments. The housing cover 26 is operable between a closed position, wherein the housing body 24 and the housing cover 26 cooperate to form an enclosure about the interior region 30 of the housing 22, as illustrated in FIGS. 2-5 and 7, and an open position, wherein access to the interior region 30 of the housing 22 is provided, as illustrated exemplarily in FIG. 8. As illustrated in FIG. 8, in some implementations, the housing cover 26 is operable to be removed from the housing body 24. As such, the housing cover 26 may be removed from the housing body 24 in the open position, as illustrated in FIG. 8. The gasket 28 may be coupled with the housing body 24 and/or the housing cover 26. In various embodiments, the gasket 28 is sandwiched between the housing body 24 and the housing cover 26. The gasket 28 may be a metal gasket, and may define the opening 36 and the at least one passage 38, as described further herein. It is contemplated that the gasket may be a one or more of a variety of types of rigid plates and may be formed of one or more of a variety of materials (e.g., metal, plastic, etc.), in various embodiments. The gasket 28 may be removably coupled with the housing body 24 and the housing cover 26, in various implementations.

Referring now to FIGS. 2-11, the housing 22 defines the primary oil reservoir 32 and the secondary oil reservoir 34. In various implementations, the interior region 30 of the housing 22 includes the primary oil reservoir 32 and the secondary oil reservoir 34. The primary oil reservoir 32 is configured to act as a reservoir for oil 40 of the electric drive unit 10. The primary oil reservoir 32 may be a portion of the interior region 30 of the housing 22 in which at least one gearset 48 of the electric drive unit 10 is disposed. For example, in the embodiment illustrated in FIG. 2, the transmission assembly 16 and the differential assembly 18 are disposed within the primary oil reservoir 32. It is contemplated that the entirety of the primary oil reservoir 32 and/or the secondary oil reservoir 34 need not be filled with oil 40, and that the oil levels within the primary oil reservoir 32 and the secondary oil reservoir 34 may be variable with different operating states of the electric drive unit 10. In operation of the electric drive unit 10, gears 54 of the transmission assembly 16 and/or the differential assembly 18, such as the ring gear 20, may be lubricated by oil 40 disposed within the primary oil reservoir 32, and the gears 54 of the differential assembly 18 and/or the transmission assembly 16 may be configured to splash oil 40 throughout various portions of the interior region 30 of the housing 22.

The secondary oil reservoir 34 may be configured to receive oil 40 from the primary oil reservoir 32 during operation of the electric drive unit 10, and the oil 40 from the secondary oil reservoir 34 is configured to be delivered to specific components of the electric drive unit 10, as described further herein. In various embodiments, the housing 22 defines the opening 36 via which the primary oil reservoir 32 and the secondary oil reservoir 34 are in fluid communication. The secondary oil reservoir 34 is configured to receive oil 40 from the primary oil reservoir 32 (e.g., by splashing of the oil 40 by the ring gear 20 of the differential assembly 18) through the opening 36 that fluidly connects the primary oil reservoir 32 and the secondary oil reservoir 34. The housing 22 further defines at least one passage 38. The at least one passage 38 is configured to convey oil 40 from the secondary oil reservoir 34 into the primary oil reservoir 32. In various embodiments, the at least one passage 38 is configured to convey oil 40 to a specific component of the electric drive unit 10 disposed within the primary oil reservoir 32 defined by the housing 22, as described further herein. In various embodiments, the housing 22 includes at least one elongated tubular conduit 64 that defines the at least one passage 38, as illustrated in FIG. 2. An outlet 66 of the at least one elongated tubular conduit 64 that is distal from the secondary oil reservoir 34 may be positioned proximate to the component of the electric drive unit 10 that the oil 40 flowing through the at least one passage 38 is configured to lubricate. In various embodiments, the secondary oil reservoir 34 is elevated vertically relative to the oil level of oil 40 disposed within the primary oil reservoir 32. Further, the opening 36 that fluidly connects the primary oil reservoir 32 and the secondary oil reservoir 34 may be elevated vertically relative to the at least one passage 38 that is defined by the housing 22. As such, in operation of the electric drive unit 10, oil 40 is configured to be delivered into the secondary oil reservoir 34 from the primary oil reservoir 32 through the opening 36 (e.g., by splashing of the oil 40 within the primary oil reservoir 32 by the ring gear 20 of the differential assembly 18). Gravity then propels the oil 40 within the secondary oil reservoir 34 into the at least one passage 38 and back into the primary oil reservoir 32 where components of the electric drive unit 10 are in need of lubrication.

Referring still to FIGS. 2-11, in various implementations, the gasket 28 and the housing cover 26 of the housing 22 cooperate to define the secondary oil reservoir 34, and the housing body 24 defines the primary oil reservoir 32. In various implementations, the gasket 28 and/or the housing cover 26 define the opening 36 that fluidly connects the primary oil reservoir 32 and the secondary oil reservoir 34, and the gasket 28 defines the at least one passage 38. In various implementations, the at least one passage 38 comprises a plurality of passages 38. For example, as illustrated in FIG. 2, the gasket 28 includes first and second elongated tubular conduits 64A, 64B that define first and second passages 38A, 38B. In some implementations, the at least one elongated tubular conduit 64 is a portion of the gasket 28. It is contemplated that the at least one elongated tubular conduit 64 may be a separate component that is coupled to the gasket 28, in some embodiments.

In various implementations, the secondary oil reservoir 34 is configured to convey oil 40 through the at least one passage 38 to one or more particular components of the differential assembly 18 and/or the transmission assembly 16 (e.g., gear mesh points, seals, bearings, etc.). For example, as illustrated in FIG. 2, the first and second elongated tubular conduits 64A, 64B that define the first and second passages 38A, 38B extending outward from the secondary oil reservoir 34 are angled vertically downward and toward first and second side bearings 60A, 60B of the differential assembly 18, respectively, such that oil 40 within the secondary oil reservoir 34 is conveyed by gravity through the first and second passages 38A, 38B to the first and second side bearings 60A, 60B, respectively. As such, the first and second side bearings 60A, 60B are lubricated during operation of the electric drive unit 10.

Figure 3:
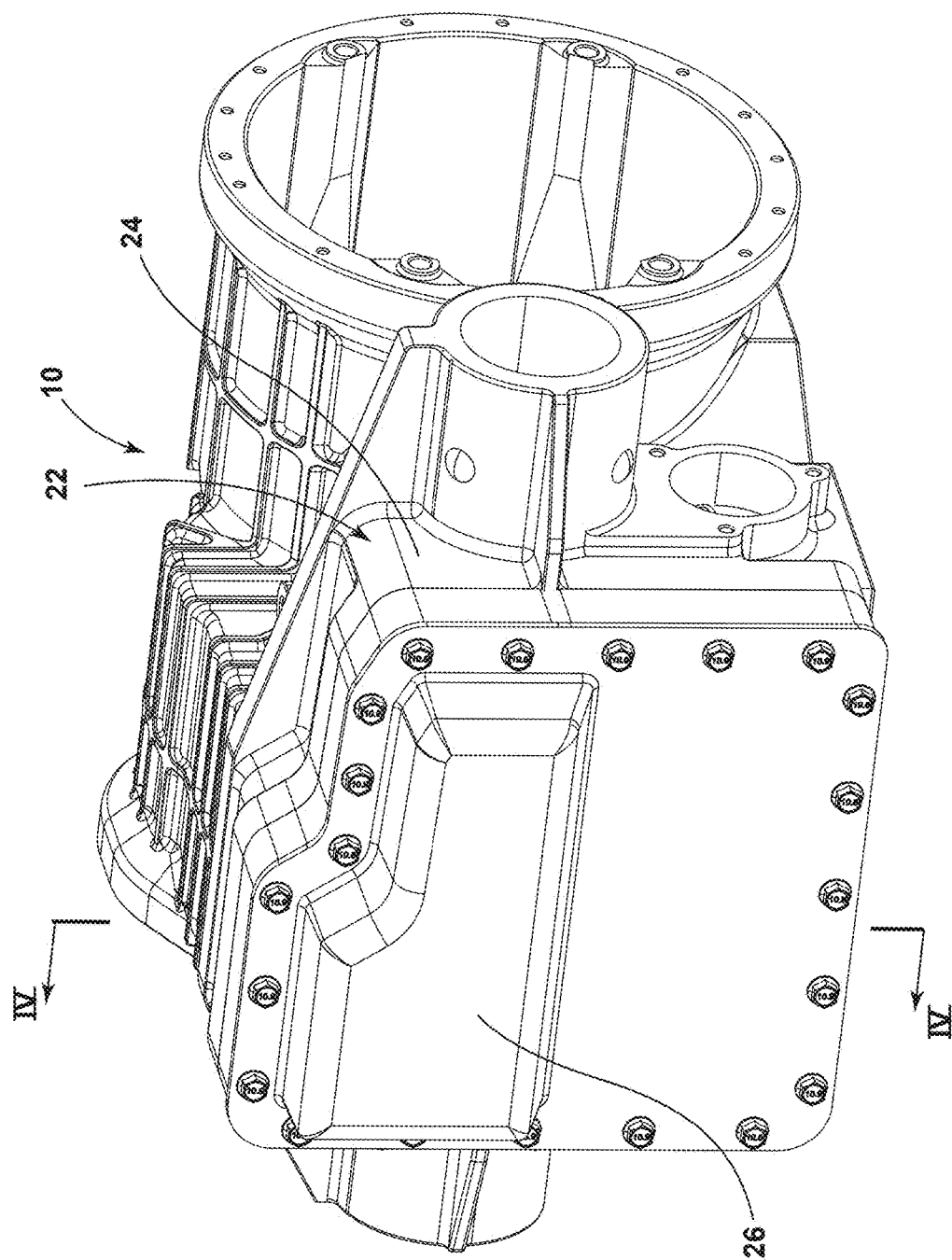
FIG. 3 is a perspective view of an electric drive unit, illustrating a housing that includes a housing body and a housing cover, according to one embodiment.
Figure 4:
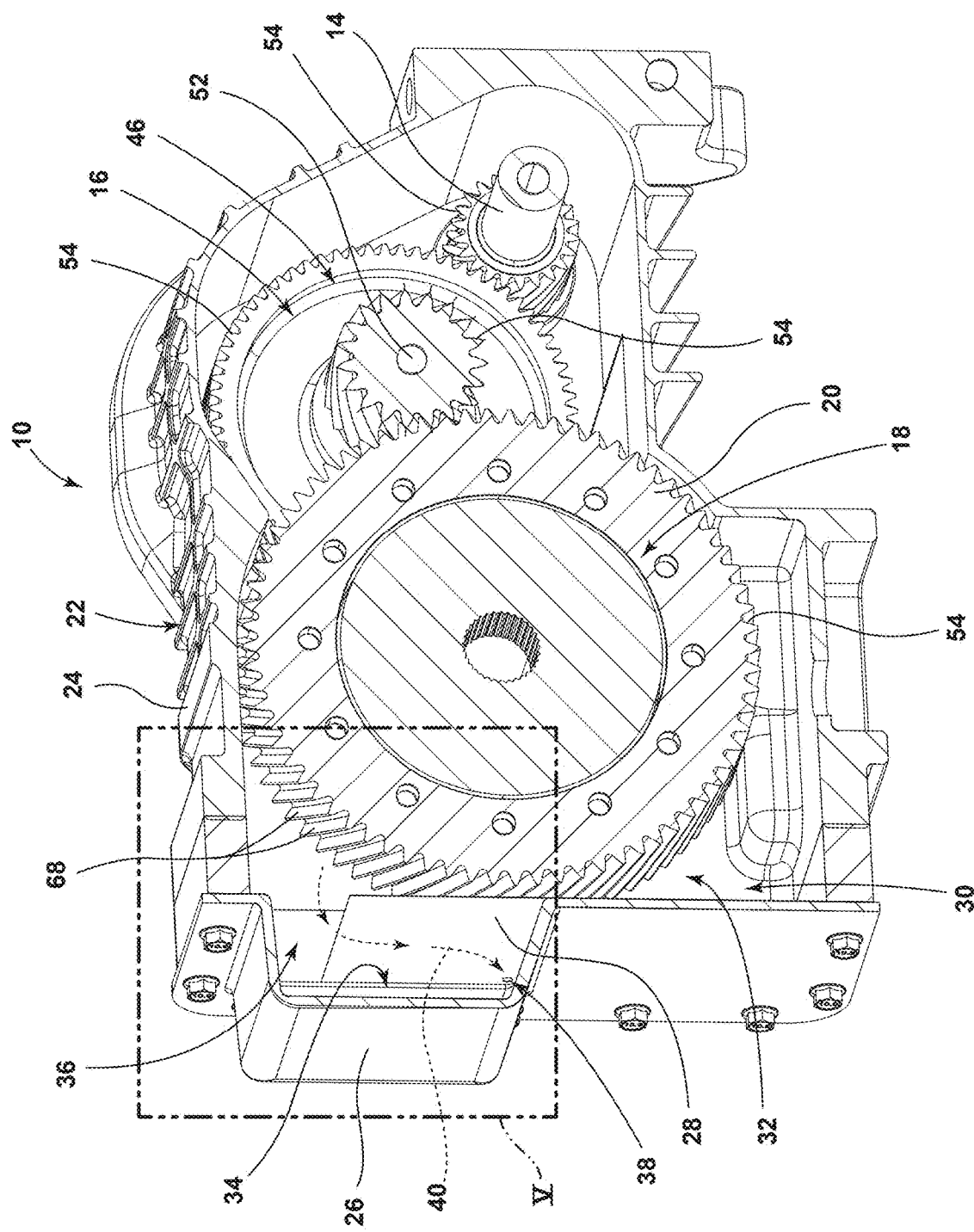
FIG. 4 is a cross-sectional view of the electric drive unit of FIG. 3 taken at line IV-IV, illustrating a ring gear of a differential assembly, a primary oil reservoir defined by a housing body, and a secondary oil reservoir defined by a housing cover and a gasket coupled to the housing cover, according to one embodiment.
Figure 5:
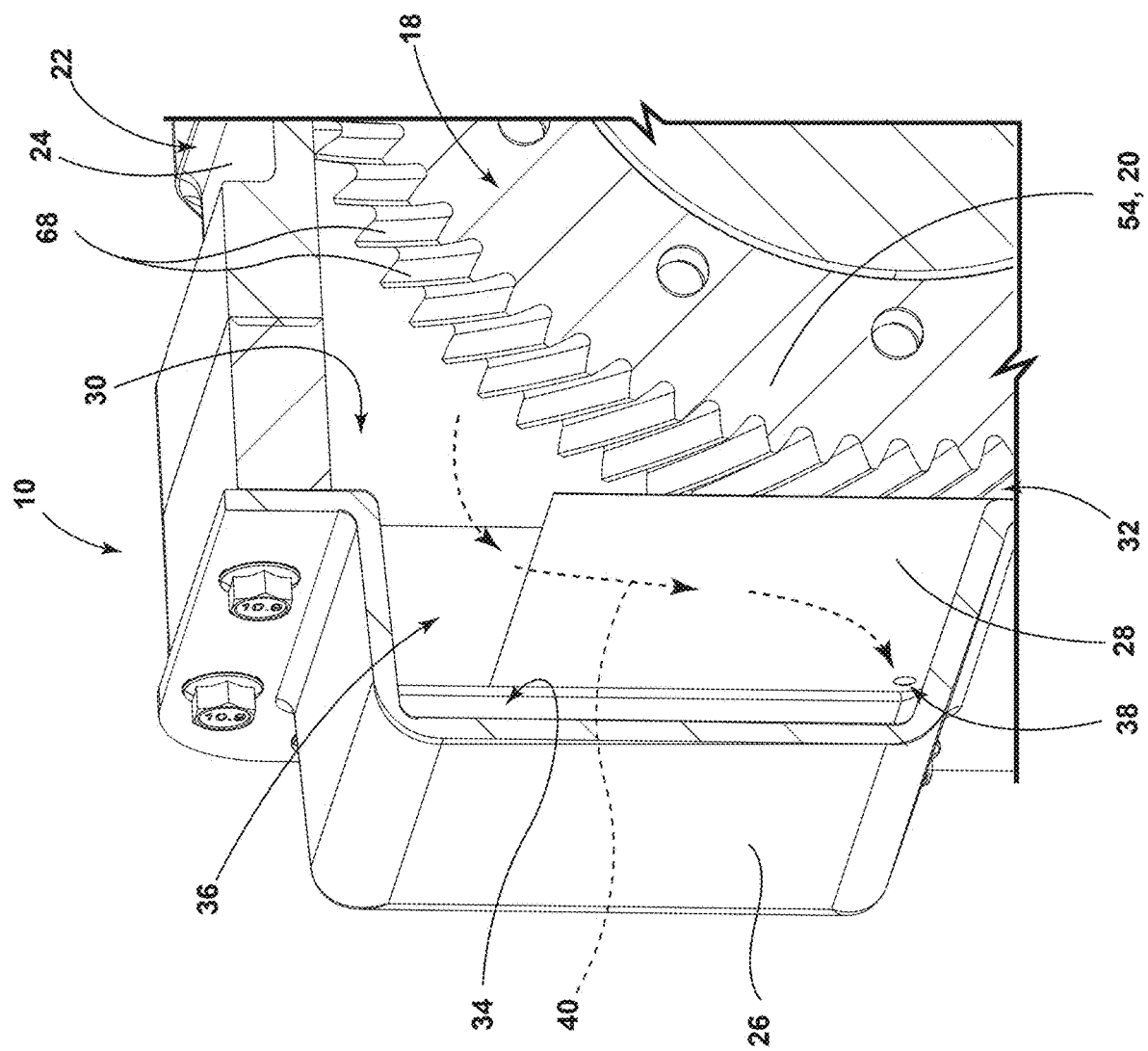
FIG. 5 is an enlarged view of the electric drive unit of FIG. 4 at area V, illustrating the gasket defining the secondary oil reservoir, an opening to the secondary oil reservoir, and a passage through which oil flows from the secondary oil reservoir into the primary oil reservoir, according to one embodiment.

Referring now to FIGS. 3-6, an exemplary implementation of the electric drive unit 10 is illustrated. The electric drive unit 10 includes the differential assembly 18 that includes the ring gear 20, the transmission assembly 16, and the housing 22 that defines the interior region 30. The housing 22 includes the housing body 24 that defines the primary oil reservoir 32, the housing cover 26, and the gasket 28 that is coupled to the housing cover 26. The housing cover 26 and the gasket 28 cooperate to define the secondary oil reservoir 34, which is elevated vertically relative to at least a portion of the primary oil reservoir 32. As illustrated in FIGS. 4 and 5, the gasket 28 defines the opening 36 to the secondary oil reservoir 34 and the at least one passage 38 that is positioned vertically downward of the opening 36. As illustrated in FIG. 5, the opening 36 is axially aligned with the ring gear 20 of the differential assembly 18 and is oriented to generally face teeth 68 of the ring gear 20. As such, splashing of oil 40 from the primary oil reservoir 32 by the ring gear 20 causes the oil 40 to be delivered directly through the opening 36 and into the secondary oil reservoir 34. As illustrated in FIGS. 3-5, the housing cover 26 is bolted to the housing body 24 of the housing 22, and is removable via removal of the bolts. Further, the gasket 28 is coupled with the housing cover 26. As illustrated in FIG. 6, first and second elongated tubular conduits 64A, 64B extend outward from a surface of the gasket 28 that is opposite the secondary oil reservoir 34. As illustrated in FIG. 6, the first and second elongated tubular conduits 64A, 64B extend downward at an angle, such that oil 40 within the secondary oil reservoir 34 is conveyed through the first and second passages 38A, 38B defined by the first and second elongated tubular conduits 64A, 64B by gravity.

Figure 9:
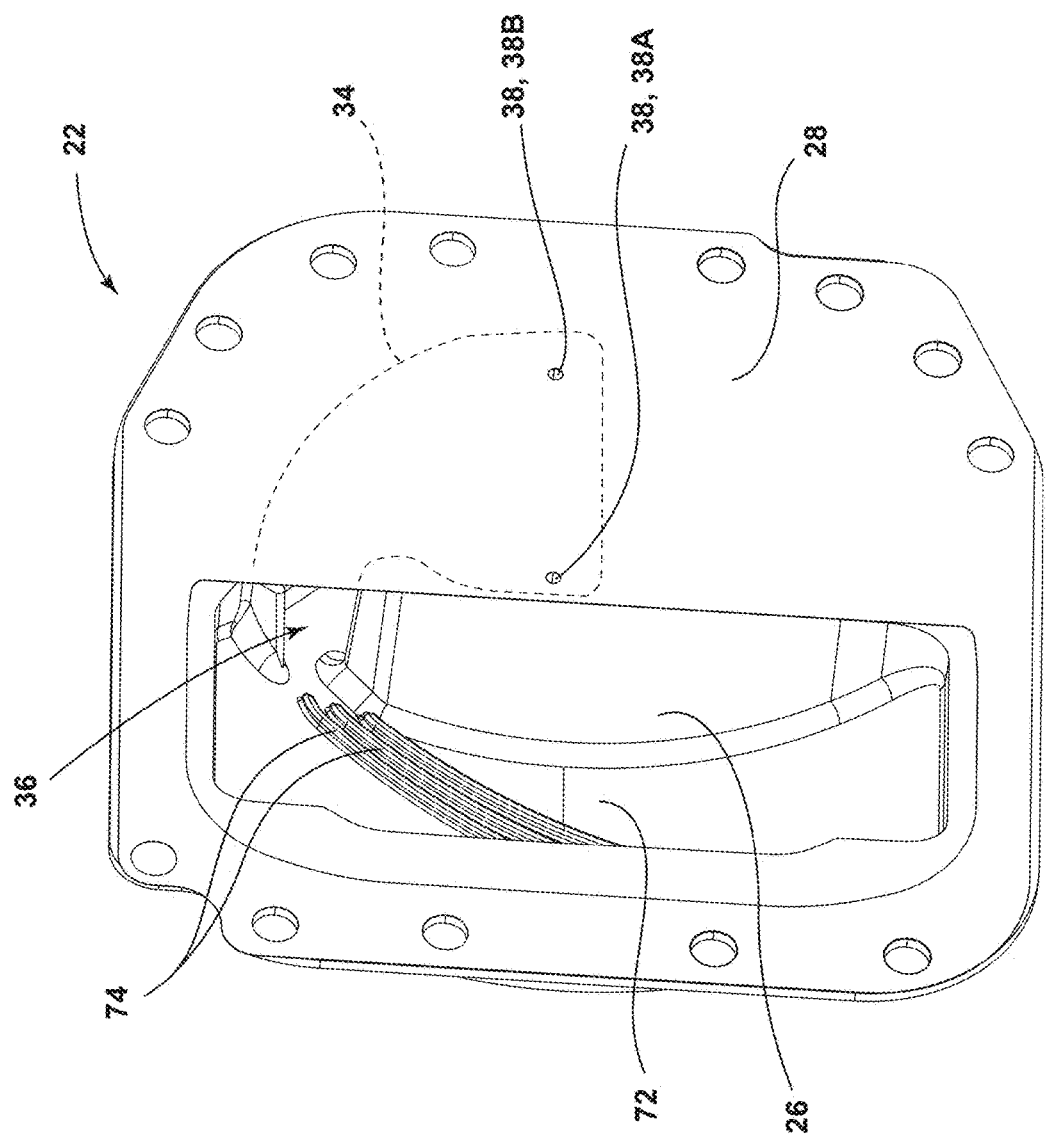
FIG. 9 is a perspective view of a housing cover and a gasket coupled to the housing cover, such that the gasket and the housing cover define a secondary oil reservoir, according to one embodiment.
Figure 10:
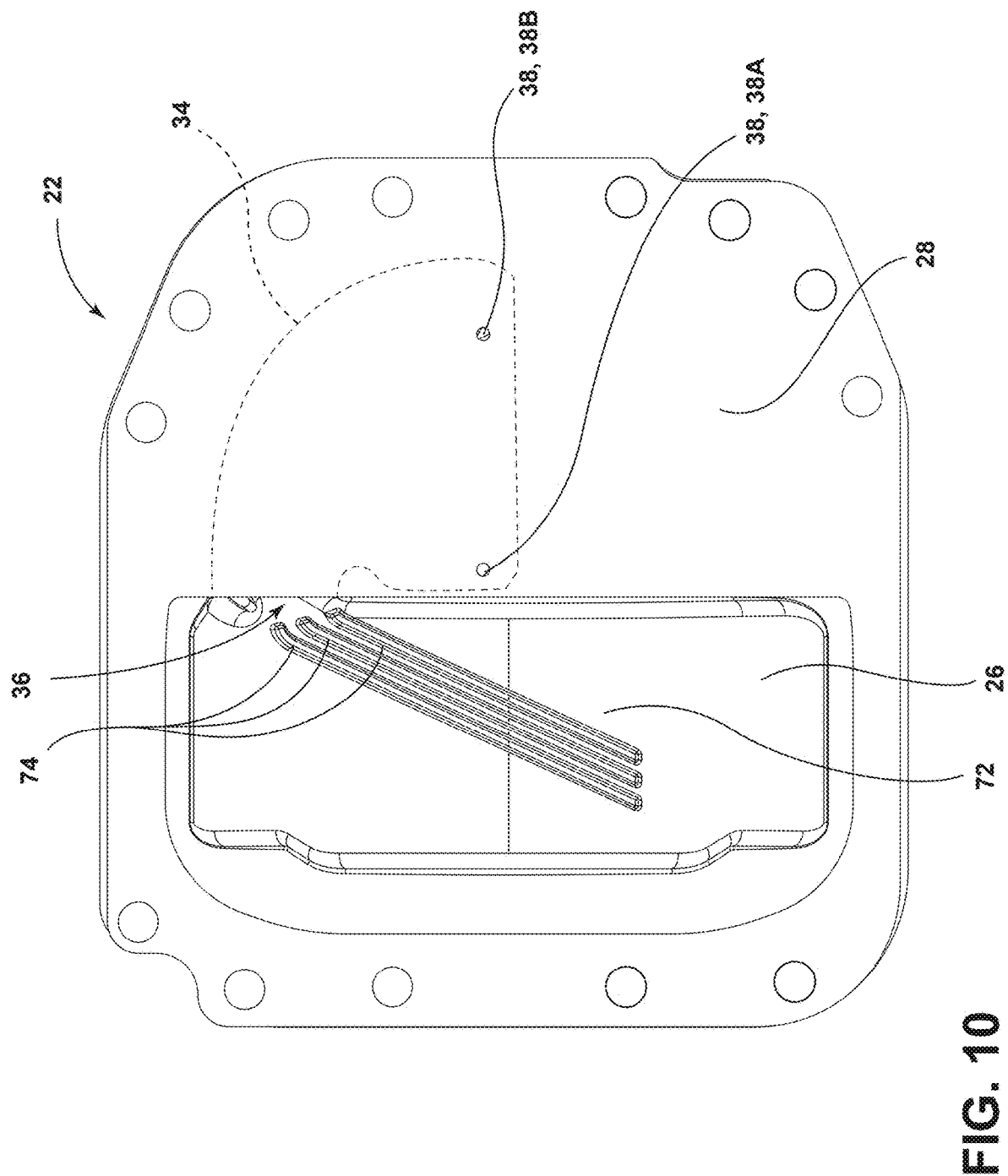
FIG. 10 is an elevational view of the housing cover and gasket of FIG. 9, illustrating a plurality of ribs that protrude outward from the housing cover, according to one embodiment.
Figure 11:
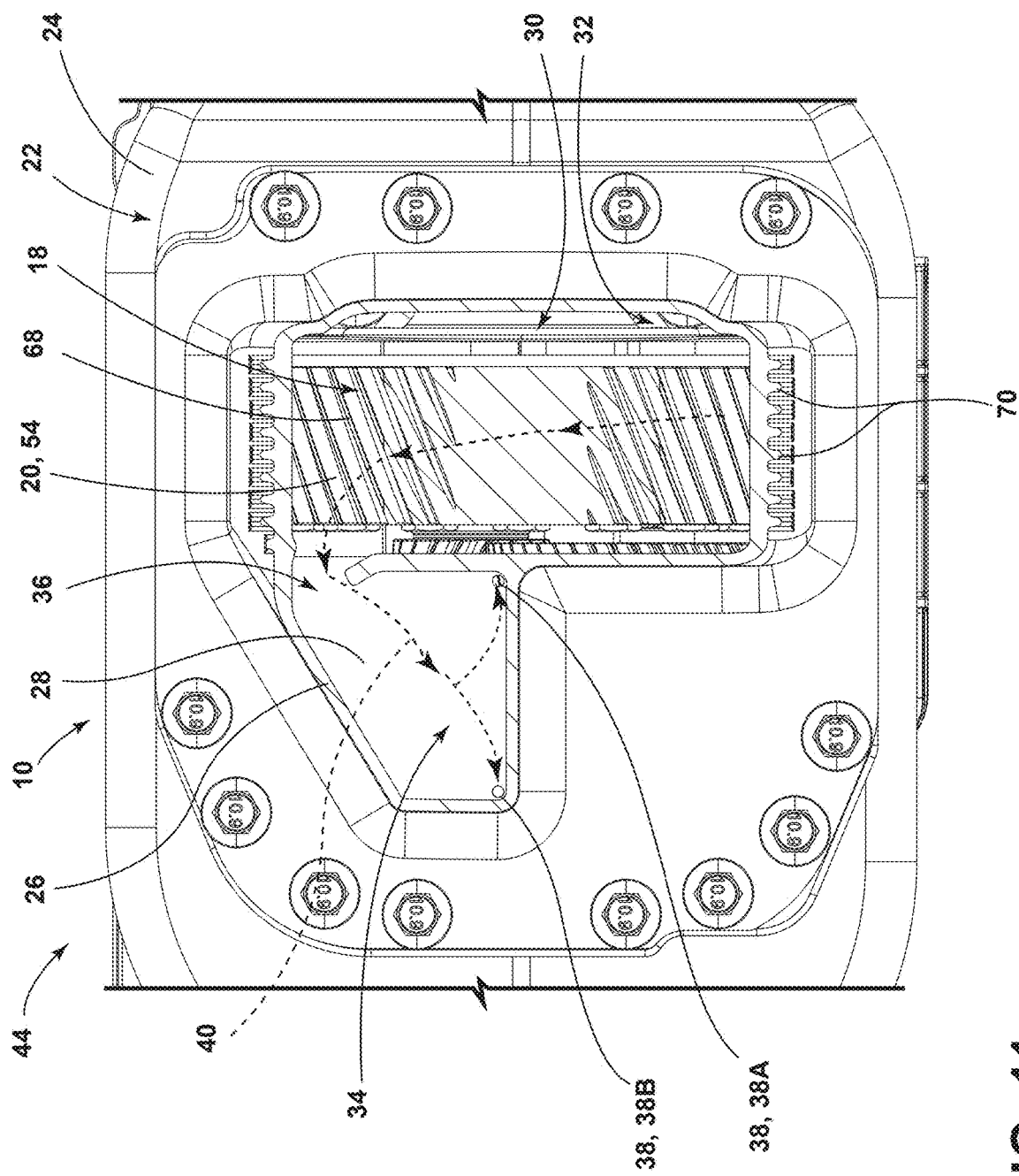
FIG. 11 is a cross-sectional view of a portion of the electric axle assembly of FIG. 7 taken at line XI-XI, illustrating a ring gear of a differential assembly, a gasket that defines a secondary oil reservoir and first and second passages, and a portion of the housing cover that cooperates with the gasket to define the secondary oil reservoir, according to one embodiment.

Referring now to FIGS. 7-11, another exemplary embodiment of the electric drive unit 10 is illustrated. The illustrated embodiment of the electric drive unit 10 includes the housing 22 that includes the housing body 24, the housing cover 26, and the gasket 28. The housing cover 26 includes a plurality of external fins 70, as illustrated in FIGS. 7 and 8, that increase the heat transfer coefficient of the housing cover 26, which allows for more efficient cooling of oil 40 disposed within the secondary oil reservoir 34 defined by the housing cover 26 and the gasket 28. As illustrated in FIGS. 7 and 8, the housing cover 26 is operable between the closed position, as illustrated in FIG. 7, and the open position, as illustrated in FIG. 8, wherein the housing cover 26 is removed from the housing body 24. As illustrated in FIGS. 8 and 11, the electric drive unit 10 includes the differential assembly 18, which includes the ring gear 20. As illustrated in FIG. 11, the ring gear 20 of the differential assembly 18 is axially offset from the secondary oil reservoir 34 that is defined by the gasket 28 and the housing cover 26. In the exemplary embodiment, a portion of the ring gear 20 is positioned radially outboard of a portion of the secondary oil reservoir 34 with respect to the axis about which the ring gear 20 rotates, while the housing cover 26 is in the closed position. As such, the teeth 68 of the ring gear 20 are configured to splash oil 40 from the primary oil reservoir 32 onto a surface of the housing cover 26 that is axially offset and adjacent to the portion of the housing cover 26 that defines the secondary oil reservoir 34. As illustrated in FIGS. 9 and 10, the housing cover 26 includes a concave arcuate portion 72 that is adjacent to the secondary oil reservoir 34 and that accommodates the ring gear 20. As illustrated in FIG. 10, the concave portion 72 of the housing cover 26 includes a plurality of ribs 74 that guide oil 40 delivered onto the housing cover 26 from the ring gear 20 axially toward the opening 36. As illustrated in FIG. 10, the plurality of ribs 74 are angled upward and axially toward the opening 36 to the secondary oil reservoir 34, such that oil 40 that is delivered onto the concave portion 72 of the housing cover 26 is influenced by the ribs 74 to flow through the opening 36 and into the secondary oil reservoir 34. As illustrated in FIGS. 9 and 10, the gasket 28 of the housing 22 defines first and second passages 38A, 38B that allow oil 40 disposed within the secondary oil reservoir 34 to flow back into the primary oil reservoir 32 to components of the electric drive unit 10 that require lubrication.

The electric drive unit 10 of the present disclosure may provide a variety of advantages. First, the housing 22 defining the secondary oil reservoir 34 that fills with oil 40 during operation of the electric drive unit 10 may result in a reduced amount of oil 40 within the primary oil reservoir 32, which may reduce drag on gears 54 and other components of the differential assembly 18 and/or the transmission assembly 16 due to oil 40 within the primary oil reservoir 32 during operation of the electric drive unit 10. Second, the housing 22 having at least one elongated tubular conduit 64 that angles downward allows for oil 40 to be conveyed out of the secondary oil reservoir 34 into the primary oil reservoir 32 with positional particularity. The presence of the elongated tubular conduits 64, rather than merely a drain hole, allows for the oil 40 to be conveyed to components of the electric drive unit 10 that require lubrication, such as bearings 56 and seals 62.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 electric drive unit
12 motor
14 rotor shaft
16 transmission assembly
18 differential assembly
20 ring gear
22 housing
24 housing body
26 housing cover
28 gasket
30 interior region
32 primary oil reservoir
34 secondary oil reservoir
36 opening
38 at least one passage
38A first passage
38B second passage
40 oil
42 vehicle
44 electric axle assembly
46 wheel
48 gearsets
50 half shafts
52 intermediate shaft
54 gear
56 bearings
58 differential housing
60 side bearings
60A first side bearing
60B second side bearing
62 seal
64 tubular conduit
64A first tubular conduit
64B second tubular conduit
66 outlet
68 teeth
70 fins
72 concave portion/concave arcuate portion
74 ribs

What is claimed is:

1. An electric drive unit, comprising:
   a motor that drives rotation of a rotor shaft;
   a transmission assembly operably coupled with the rotor shaft;
   a differential assembly that includes a ring gear that interfaces with a gear of the transmission assembly, such that rotation of the rotor shaft drives rotation of the ring gear; and
   a housing, comprising:
      a housing body;
      a housing cover that cooperates with the housing body to define an interior region of the housing in which the transmission assembly and differential assembly are disposed, wherein the interior region includes a primary oil reservoir; and
      a gasket coupled with the housing cover such that the housing cover and the gasket cooperate to define a secondary oil reservoir, the gasket defining an opening that is axially offset from the ring gear and at least one passage, wherein a portion of the ring gear is positioned radially outboard of a portion of the secondary oil reservoir with respect to the axis about which the ring gear rotates, rotation of the ring gear is configured to deliver oil into the secondary oil reservoir from the primary oil reservoir via the opening defined by the gasket, and the at least one passage is configured to convey oil to a portion of the differential assembly, and wherein the housing cover includes a plurality of ribs that guide oil delivered onto the housing cover from the ring gear axially toward the opening, wherein the gasket includes at least one elongated tubular conduit that defines the at least one passage, the at least one elongated tubular conduit extending outward from a surface of the gasket that is opposite the secondary oil reservoir.

2. The electric drive unit of claim 1, wherein gravity propels the oil to the portion of the differential assembly from the secondary oil reservoir via the at least one passage.

3. The electric drive unit of claim 1, wherein the at least one passage is configured to convey oil to a bearing of the differential assembly.

4. The electric drive unit of claim 3, wherein the bearing is a side bearing.

5. The electric drive unit of claim 1, wherein the at least one passage comprises:
   a first passage that is configured to convey oil to a first side bearing of the differential assembly; and
   a second passage that is configured to convey oil to a second side bearing of the differential assembly opposite the first side bearing.

6. The electric drive unit of claim 1, wherein the opening is oriented to generally face teeth of the ring gear.

7. An electric drive unit, comprising:
a motor that drives rotation of a rotor shaft;
a transmission assembly;
a differential assembly that is operably coupled with the transmission assembly via a ring gear;
a housing cover that includes a plurality of ribs and that defines a primary oil reservoir in which the transmission assembly and the differential assembly are disposed, a secondary oil reservoir, an opening via which the primary oil reservoir and the secondary oil reservoir are in fluid communication, the opening being axially offset from the ring gear, and at least one passage, wherein the at least one passage is defined by at least one elongated tubular conduit, wherein rotation of the ring gear is configured to deliver oil onto a portion of the housing cover that includes the plurality of ribs, and the plurality of ribs are configured to guide the oil into the secondary oil reservoir from the primary oil reservoir via the opening; and
a gasket including the at least one elongated tubular conduit, coupled with the housing cover such that the housing cover and the gasket cooperate to define a secondary oil reserve.

8. The electric drive unit of claim 7, wherein the at least one passage comprises:
a first passage that is defined by a first elongated tubular conduit; and
a second passage that is defined by a second elongated tubular conduit.

9. The electric drive unit of claim 8, wherein the first passage conveys oil to a first side bearing of the differential assembly, and the second passage conveys oil to a second side bearing of the differential assembly.

10. The electric drive unit of claim 7, wherein the at least one elongated tubular conduit angles vertically downward to an outlet, such that the oil is conveyed within the at least one passage by gravity.

11. The electric drive unit of claim 7, wherein the opening is oriented to generally face teeth of the ring gear.

12. The electric drive unit of claim 7, wherein a portion of the ring gear is positioned radially outboard of a portion of the secondary oil reservoir with respect to the axis about which the ring gear rotates.

13. An assembly, comprising:
a gearset; and
a housing that defines a primary oil reservoir in which the gearset is disposed, a secondary oil reservoir, an opening via which the primary oil reservoir and the secondary oil reservoir are in fluid communication, and at least one passage defined by an elongated tubular conduit that is configured to convey oil from the secondary oil reservoir into the primary oil reservoir during operation of the gearset, wherein the housing includes a housing body that defines the primary reservoir, a housing cover, and a gasket that is disposed between the housing cover and the housing body and that forms the elongated tubular conduit.

14. The assembly of claim 13, wherein the gearset is a portion of a differential assembly.

15. The assembly of claim 13, further comprising:
a bearing, wherein the elongated tubular conduit defines an outlet of the at least one passage that is proximate to the bearing, such that oil is conveyed to the bearing via the at least one passage.

* * * * *